(12) United States Patent
Breslau et al.

(10) Patent No.: US 9,304,743 B1
(45) Date of Patent: Apr. 5, 2016

(54) CONVERTING FROM INCORRECT PROGRAM CODE TO CORRECT PROGRAM CODE

(71) Applicant: The MathWorks, Inc., Natick, MA (US)

(72) Inventors: Jason D. Breslau, Holliston, MA (US); Fnu Balaji, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/685,956

(22) Filed: Apr. 14, 2015

Related U.S. Application Data

(60) Provisional application No. 62/007,105, filed on Jun. 3, 2014.

(51) Int. Cl.
*G06F 9/44* (2006.01)

(52) U.S. Cl.
CPC ... *G06F 8/33* (2013.01); *G06F 8/31* (2013.01)

(58) Field of Classification Search
USPC .................................................. 717/109–116
IPC ................................................ G06F 8/31,8/33
See application file for complete search history.

(56) References Cited

U.S. PATENT DOCUMENTS

| | | | | |
|---|---|---|---|---|
| 5,325,531 A * | 6/1994 | McKeeman | G06F 8/20 | 717/112 |
| 5,790,863 A * | 8/1998 | Simonyi | G06F 8/30 | 700/83 |
| 6,523,172 B1 * | 2/2003 | Martinez-Guerra | G06F 8/427 | 704/9 |
| 7,127,704 B2 * | 10/2006 | Van De Vanter | G06F 8/33 | 715/234 |
| 7,496,892 B2 * | 2/2009 | Nuss | G06F 8/31 | 709/200 |
| 7,752,599 B2 * | 7/2010 | Takacsi-Nagy | G06F 8/31 | 717/114 |
| 7,818,719 B2 * | 10/2010 | Meijer | G06F 9/4428 | 717/114 |
| 8,095,912 B2 * | 1/2012 | Giuseppini | G06F 8/427 | 714/715 |
| 8,464,234 B2 * | 6/2013 | Novillo | G06F 8/42 | 717/140 |
| 8,732,674 B1 * | 5/2014 | Agha | G06F 9/45516 | 717/130 |
| 8,843,907 B2 * | 9/2014 | Xu | G06F 8/427 | 717/140 |

OTHER PUBLICATIONS

Forman et al, "Extremely Fast Text Feature Extraction for Classification and Indexing", ACM, pp. 1221-1230, 2008.*
Laboreiro et al, "Tokenizing Micro-Blogging Messages using a Text Classification Approach", ACM, pp. 81-87, 2010.*

(Continued)

*Primary Examiner* — Anil Khatri
(74) *Attorney, Agent, or Firm* — Harrity & Harrity, LLP

(57) ABSTRACT

A device may receive input text via a programming environment associated with a programming language. The device may tokenize the input text to generate tokenized text. The device may identify an invalid token string, based on the tokenized text, that is invalid for the programming language. The device may identify a token category pattern based on the invalid token string. The token category pattern may be a first sequence of token categories. The device may identify a replacement pattern based on the token category pattern. The replacement pattern may be a second sequence of token categories that is different from the first sequence of token categories. The device may identify a replacement token string based on the replacement pattern. The device may determine valid program code, associated with the programming language, based on the replacement token string. The device may provide the valid program code.

20 Claims, 14 Drawing Sheets

(56) References Cited

OTHER PUBLICATIONS

Cutter et al, "Unsupervised Font Reconstruction Based on Token Co-occurrence", ACM, pp. 143-149, 2010.*

Hirankan et al, "Detection of Wordplay Generated by Reproduction of Letters in Social Media Texts", IEEE, pp. 6-10, 2013.*

* cited by examiner

| Error | Token category pattern | Replacement pattern | Error Prompt Text |
|---|---|---|---|
| The expression to the left of the equals sign is not a valid target for an assignment. | \<var> \<plus> \<assign> \<...> Example: x+=7 | \<var> \<assign> \<var> \<plus> \<...> Example: x = x + 7 | This TCE does not support the += operator. |
| The expression to the left of the equals sign is not a valid target for an assignment. | \<var> \<assign> \<var> \<assign> \<...> \<semi> Example: a = b = 2; | \<var> \<assign> \<...> \<semi> \<var> \<assign> \<var> \<semi> Example: b = 2; a = b; | This TCE does not support multiple assignments in the same line of code. |
| Expression or statement is incomplete or incorrect. | \<var> \<plus> \<plus> Example: a++ | \<var> \<assign> \<var> \<plus> "1" Example: a = a + 1 | This TCE does not support the post-increment operator (x++). |
| Expression or statement is incomplete or incorrect. | \<number> \<var> Example: 2y | \<number> \<times> \<var> Example: 2*y | This TCE needs the times operator between a number and a variable. |

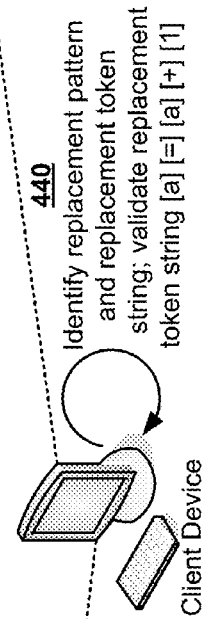

440 Identify replacement pattern and replacement token string; validate replacement token string [a] [=] [a] [+] [1]

Client Device 210

FIG. 4B

| Error | Token category pattern | Replacement pattern | Error Prompt Text |
|---|---|---|---|
| The expression to the left of the equals sign is not a valid target for an assignment. | <var> <plus> <assign> <...><br>Example: x+=7 | <var> <assign> <var> <plus> <...><br>Example: x = x + 7 | This TCE does not support the += operator. |
| The expression to the left of the equals sign is not a valid target for an assignment. | <var> <assign><br><var> <assign> <...><br><semi><br>Example: a = b = 2; | <var> <assign> <...><br><semi> <var> <assign><br><var> <semi><br>Example: b = 2; a = b; | This TCE does not support multiple assignments in the same line of code. |
| Expression or statement is incomplete or incorrect. | <var> <plus> <plus><br>Example: a++ | <var> <assign> <var><br><plus> "1"<br>Example: a = a + 1 | This TCE does not support the post-increment operator (x++). |
| Expression or statement is incomplete or incorrect. | <number><var><br>Example: 2y | <number><times><var><br>Example: 2*y | This TCE needs the times operator between a number and a variable. |

630— (top rows)
635— (bottom row)

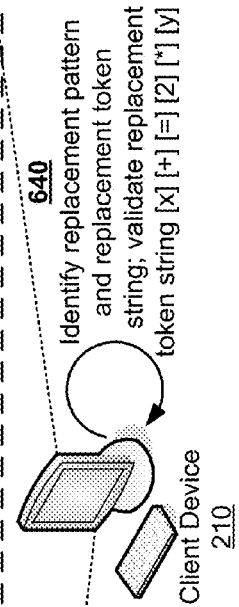

640
Identify replacement pattern and replacement token string; validate replacement token string [x] [+] [=] [2] [*] [y]

Client Device
210

FIG. 6B

CONVERTING FROM INCORRECT PROGRAM CODE TO CORRECT PROGRAM CODE

RELATED APPLICATION

This application claims priority under 35 U.S.C. §119 based on U.S. Provisional Patent Application No. 62/007,105 filed on Jun. 3, 2014, the content of which is incorporated by reference herein in its entirety.

BRIEF DESCRIPTION OF THE DRAWINGS

FIGS. 4A-4C are diagrams of an example implementation of converting from incorrect program code to correct program code;

FIGS. 6A-6E are diagrams of another example implementation of converting from incorrect program code to correct program code;

DETAILED DESCRIPTION

The following detailed description of example implementations refers to the accompanying drawings. The same reference numbers in different drawings may identify the same or similar elements.

Converting code from a first programming language to a second programming language may be difficult and error prone. Users, skilled in one programming language, may not possess the specific semantic knowledge of a second programming language to accurately implement their intended code in an efficient and syntactically correct manner and/or format in the second programming language. In some cases, a user may provide text input that is not specific to a programming language, such as a mathematical expression, which may be syntactically incorrect for a programming language. Conventional environments may issue an error indicating that an environment is incapable of correctly parsing the syntactically incorrect expression. Implementations described herein provide a user with feedback regarding the semantic accuracy of the user's input code or text. For example, the feedback may include an automatic correction of input code, an indication on a user interface that input code is incorrect and a suggestion to correct the input code, or the like. This feedback may enable more efficient, syntactically-correct implementation of code when the input code is syntactically incorrect for the intended programming language.

Figure 1:
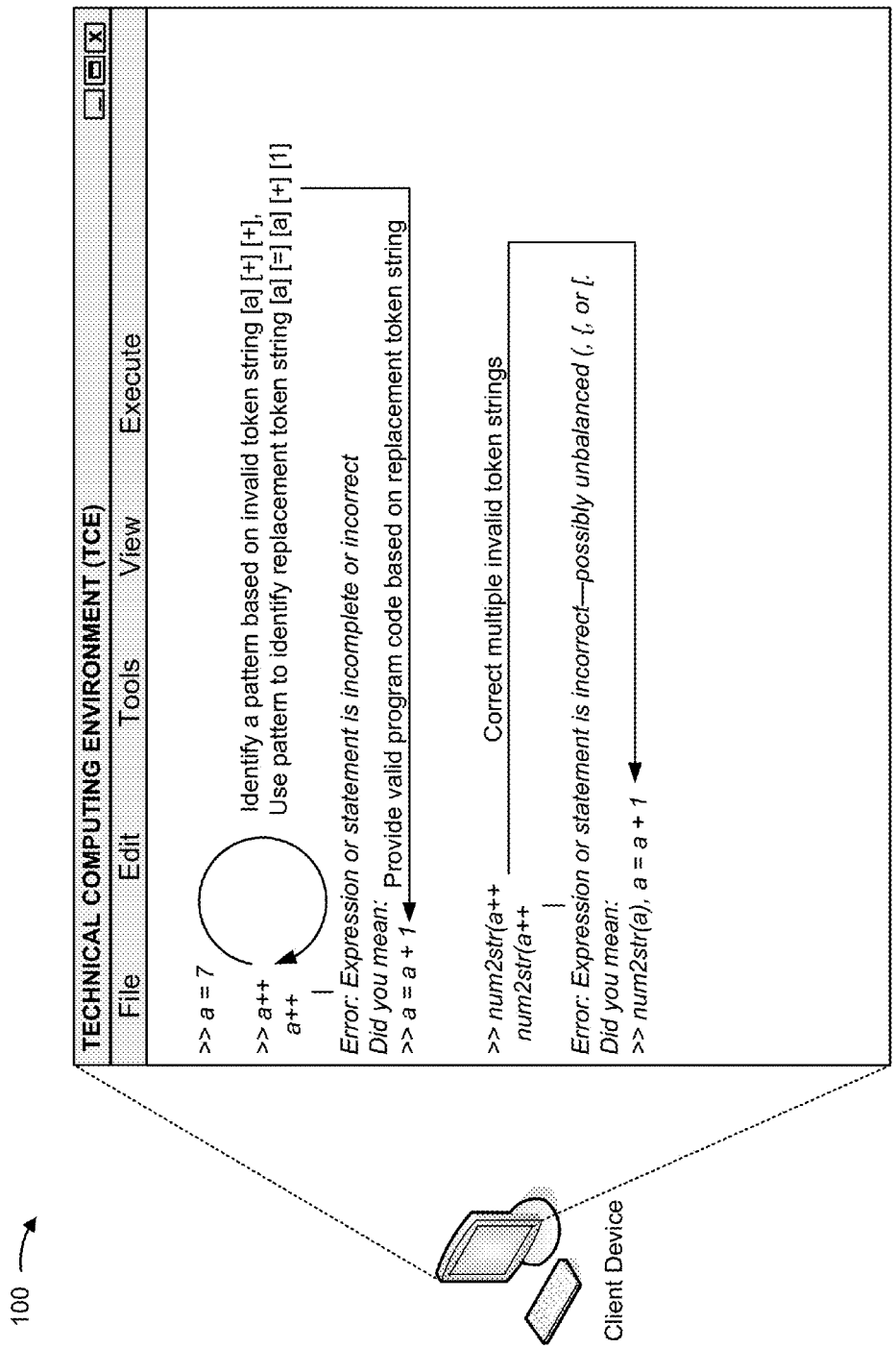
FIG. 1 is a diagram of an overview of an example implementation described herein.

FIG. 1 is a diagram of an overview of an example implementation 100 described herein. As shown in FIG. 1, implementation 100 may include a client device (e.g., a desktop computer, a laptop computer, etc.) that hosts a technical computing environment (TCE) used to input and/or execute program code. As shown, a user may input text via a user interface (e.g., a code editor) of the TCE, and may receive feedback identifying syntactic errors in the text. Recognizing an error in the input text, the client device may suggest syntactically error-free program code, corresponding to the text, and may provide the suggestion via the user interface. In some cases, the client device may automatically replace syntactically-incorrect input text with syntactically-correct program code.

As an example, and as shown in FIG. 1, assume that the user inputs the text "a=7" and "a++" via the user interface. Assume that the text "a++" is syntactically incorrect for a programming language associated with the TCE, and that the text "a++" results in an error when compiled and/or executed. As shown, assume that the text "a++" results in an error of "Expression or statement is incomplete or incorrect." Based on detecting the error, the client device may identify an invalid token string associated with the text "a++," shown as [a] [+] [+], where each item in brackets represents a token. An invalid token string may use or represent grammar that is unsupported by or otherwise incompatible with the TCE. The client device may identify a pattern based on the invalid token string and/or based on the error, and may use the pattern to identify a replacement token string, shown as [a] [=] [a] [+] [1].

The client device may provide valid program code based on the replacement token string, shown as "a=a+1." The valid program code may represent syntactically-correct program code for a programming language associated with the TCE. Furthermore, the valid program code may be program code that the user intended to input, had the user known the syntax of the programming language associated with the TCE. In this way, the client device and the TCE may make inputting valid program code easier, by allowing users to input program code, mathematical expressions, or the like, in a language (e.g., a programming language, the language of mathematics, etc.) with which the user is familiar.

As further shown in FIG. 1, the client device may employ techniques described herein to correct multiple errors associated with input text. For example, assume that the user inputs the text "num2str(a++" via the user interface. Assume, as above, that the text "a++," included in the input text, is syntactically incorrect for the programming language associated with the TCE, and that the text "a++" results in an error of "Expression or statement is incomplete or incorrect." Further, assume that the text "num2str(a++" results in an error of "Expression or statement is incorrect—possibly unbalanced (, {, or [" because the input text is missing a closing parenthesis. In this case, the client device may use techniques described herein (e.g., in an iterative manner) to correct both errors and generate the valid program code "num2str(a), a=a+1," which is valid for the programming language associated with the TCE. For example, the client device may identify a pattern based on an invalid token string, may use the pattern to identify a replacement token string, and may provide valid program code based on the replacement token string.

In this way, the client device may reduce user frustration associated with writing program code in a language with which the user in unfamiliar, by correcting invalid input text (e.g., program code). Furthermore, the client device may assist a user in learning a programming language by teaching the user the syntax of the programming language when the user inputs syntactically-incorrect text (e.g., by suggesting correct program code via a user interface). Furthermore, the client device may save computing resources (e.g., memory, processing power, etc.) by preventing execution of incorrect program code.

Figure 2:
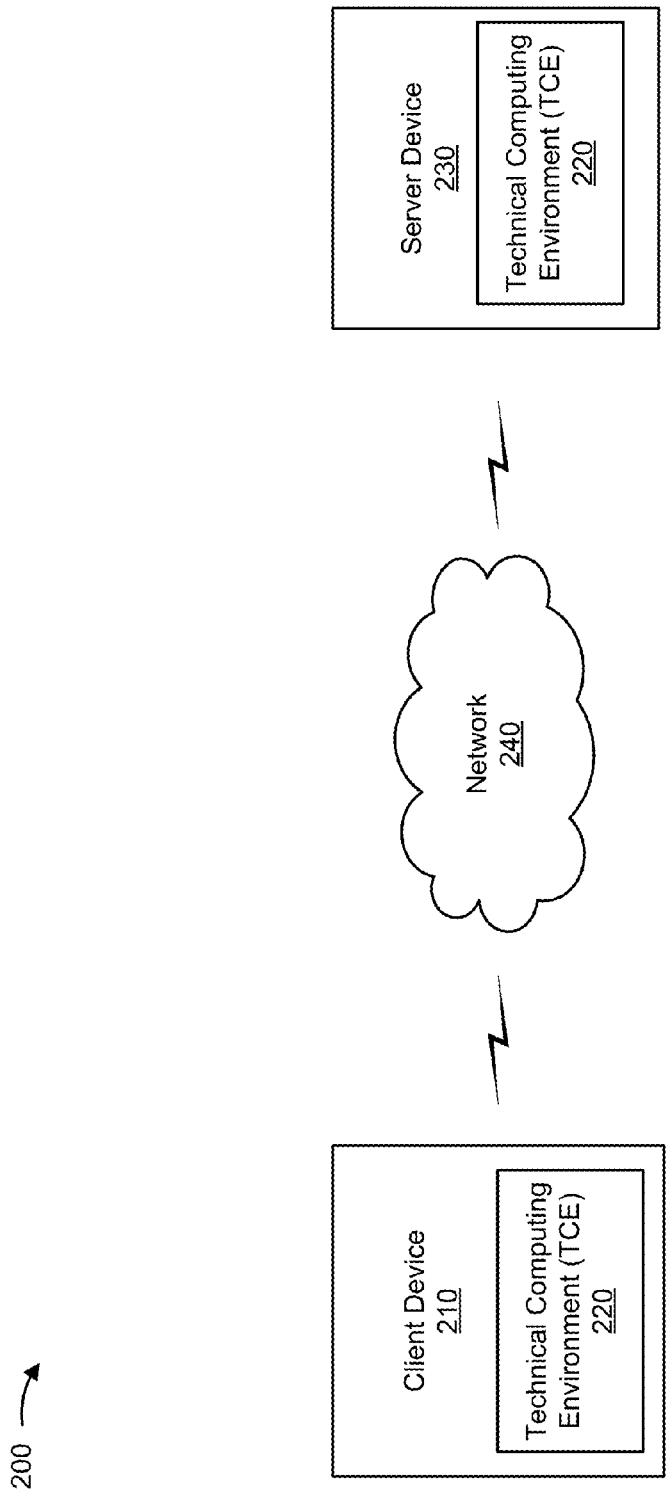
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing program code and/or information associated with program code (e.g., text, a token, an error, a pattern, etc.). For example, client device 210 may include a computing device, such as a desktop computer, a laptop computer, a tablet computer, a mobile phone (e.g., a smart phone, a radiotelephone, etc.), or a similar device. Client device 210 may receive input text, via TCE 220, in a programming language associated with TCE 220. Client device 210 may process the input text to determine whether the input text is valid. When the input text is invalid, client device 210 may determine valid program code based on the input text, as described in more detail elsewhere herein. Client device 210 may prompt a user (e.g., via a user interface of TCE 220) regarding the valid program code and/or may replace the input text with the valid program code. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based programming environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based programming environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of programming environment, such as a hybrid programming environment that includes one or more text-based programming environments and one or more graphically-based programming environments.

TCE 220 may include a programming language (e.g., the MATLAB language) that may be used to express problems and/or solutions in mathematical notations. The programming language may allow a user to enter commands to be executed by TCE 220. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 220. During run-time, when the statement "A='hello'" is executed, the data type of variable "A" may be a string data type. Later when the statement "A=int32([1, 2])" is executed, the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers, and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, a local data structure, a remote data structure (e.g., a database operating in a computing cloud), a remote procedure call (RPC), and/or an application programming interface (API). TCE 220 may be configured to improve runtime performance when performing computing operations. For example, TCE 220 may include a just-in-time (JIT) compiler.

Server device 230 may include one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
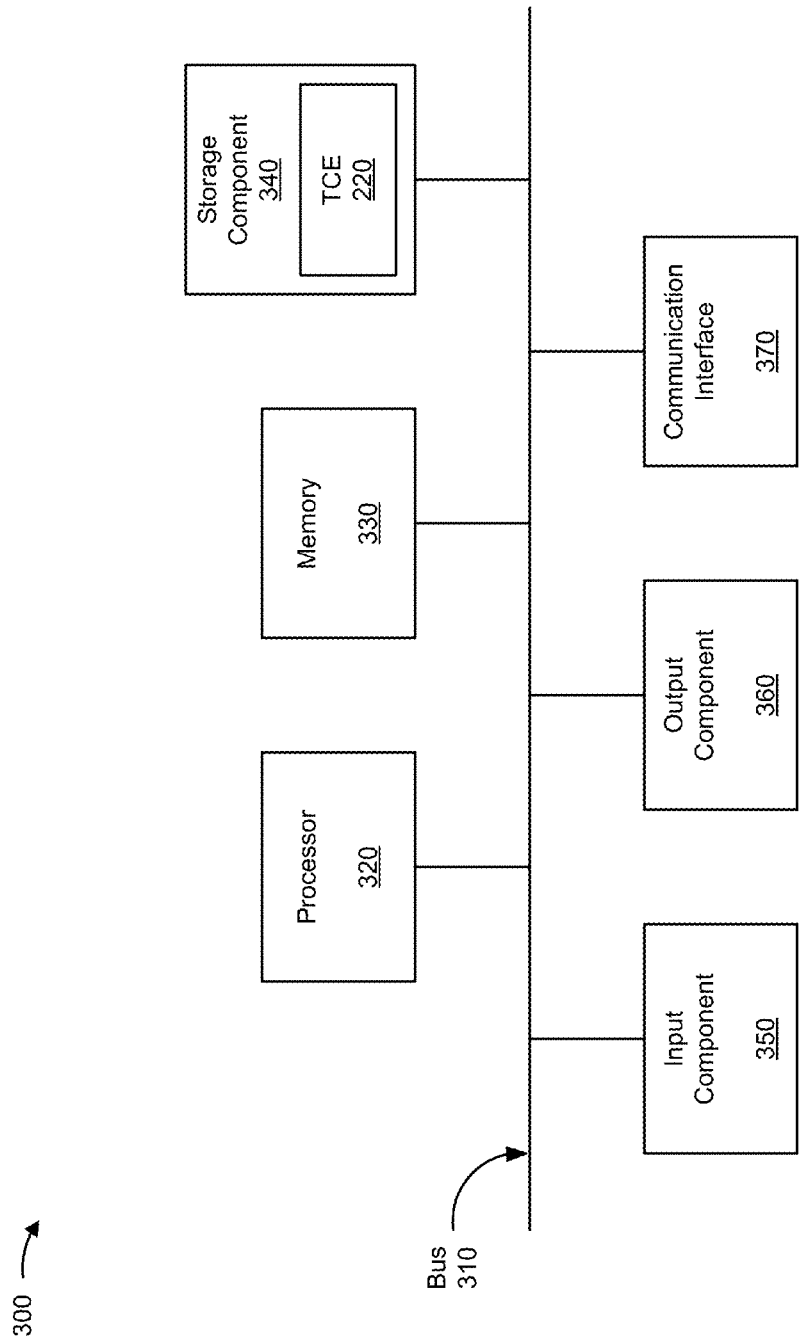
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
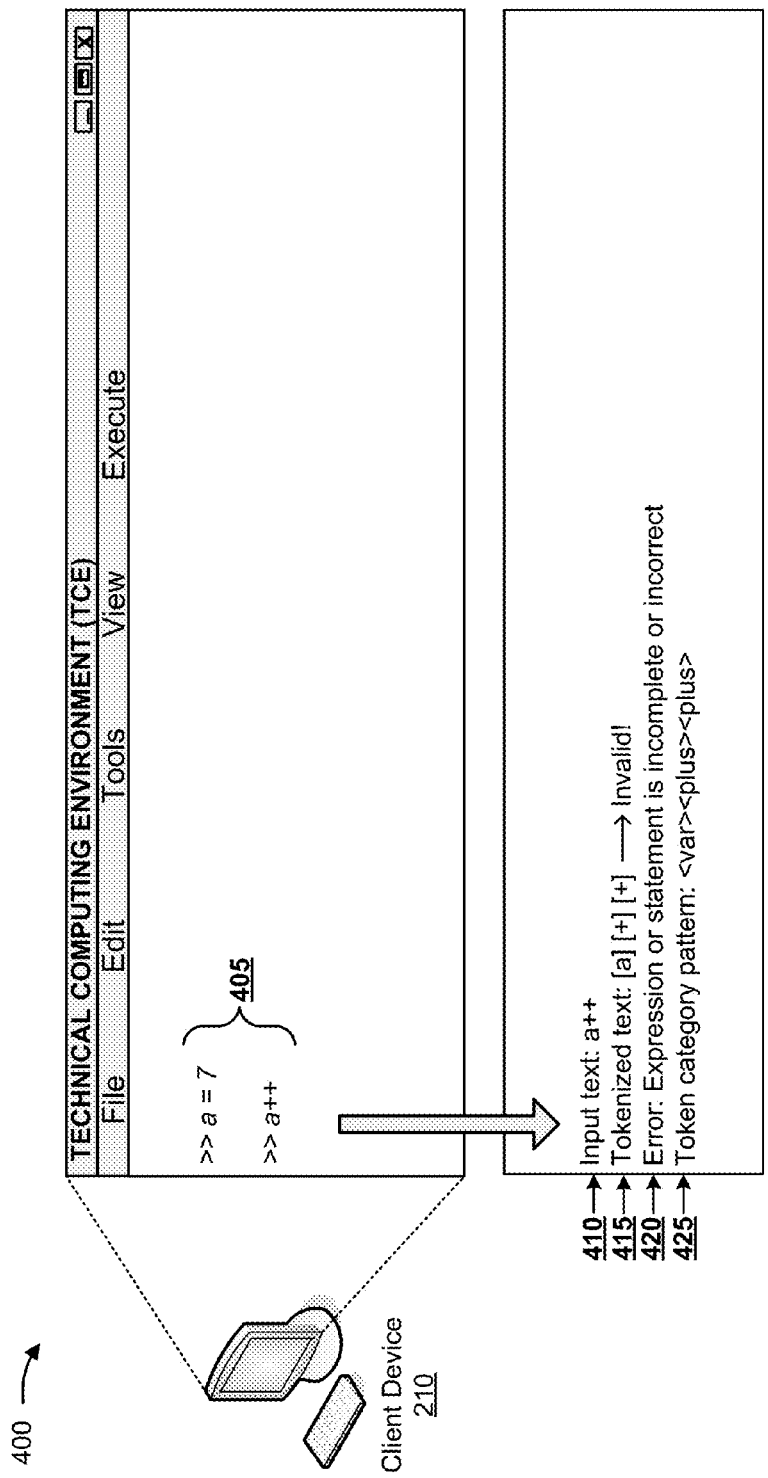
Figure 4C:
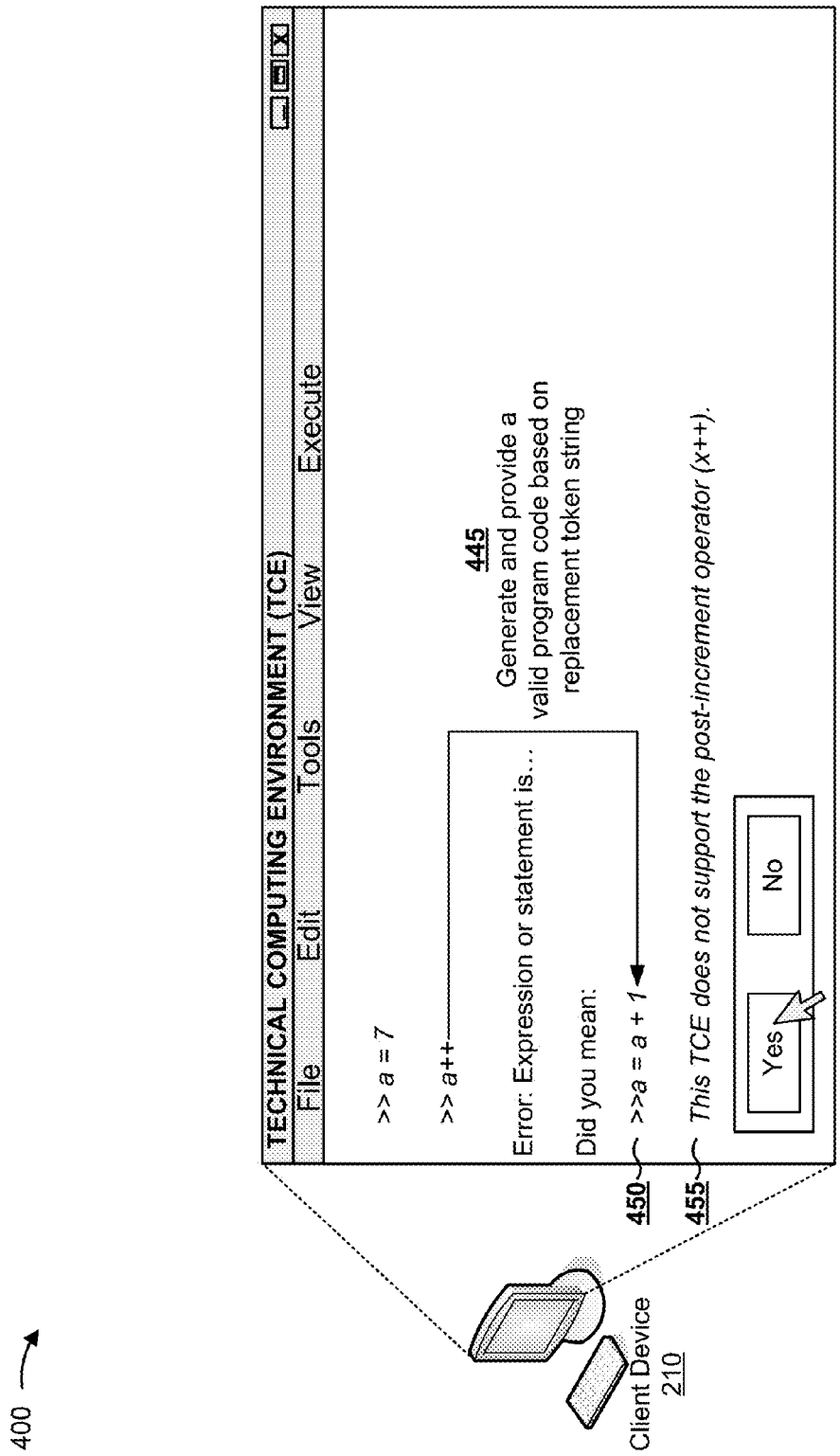

FIGS. 4A-4C are diagrams of an example implementation 400 of converting from incorrect program code to correct program code.

As shown in FIG. 4A, and by reference number 405, assume that the user inputs the text "a=7" and "a++" via the user interface. Assume that the text "a++" is syntactically incorrect for a programming language associated with TCE 220, and that the text "a++" results in an error when compiled and/or executed. As shown by reference number 410, assume that client device 210 receives the input text of "a++" based on the user input. As shown by reference number 415, assume that client device 210 tokenizes the input text by segmenting the input text into meaningful programming elements, or tokens (e.g., using lexical analysis, a lexer, a tokenizer, or the like). As shown, assume that client device 210 tokenizes the input text of "a++" into a string of three tokens, shown as [a] [+] [+], where each token is shown in brackets. As further shown, assume that client device 210 determines that this token string is invalid for the programming language associated with TCE 220.

As shown by reference number 420, assume that client device 210 identifies an error associated with the invalid token string. In this case, assume that the token string of [a] [+] [+] (e.g., based on the input text of "a++") results in an error of "Expression or statement is incomplete or incorrect." As shown by reference number 425, assume that client device 210 identifies a token category pattern based on the invalid token string. A token category pattern may refer to a pattern of (e.g., a particular combination and/or sequence of) tokens, token categories, and/or literal values. A token category may indicate a type of a token for the purpose of parsing. Examples of token categories include a variable, different types of mathematical operations (e.g., addition operator, subtraction operator, multiplication operator, division operator, etc.), an assignment operator (e.g., used to assign a value to a variable), a number, a type of number (e.g., an integer date type, a floating point data type, etc.), an array, or the like. As an example, assume that client device 210 identifies a token category pattern of <var> <plus> <plus> for the invalid token string of [a] [+] [+], indicating that "a" is a variable (e.g., represented as "<var>"), and that the plus signs are addition operators (e.g., represented as "<plus>").

As shown in FIG. 4B, assume that client device 210 uses a data structure 430 to identify a replacement pattern (e.g., a different token category pattern) based on the error and/or the token category pattern. In some implementations, client device 210 may determine the replacement pattern based on the token category pattern associated with the input text. Additionally, or alternatively, client device 210 may determine the replacement pattern based on the error associated with the input text. For the purpose of FIG. 4B, assume that client device 210 determines the replacement pattern based on both the error and the token category pattern.

As shown by reference number 435, assume that the data structure 430 indicates that the error of "Expression or statement is incomplete or incorrect" and the token category pattern of <var> <plus> <plus> are associated with a replacement pattern of <var> <assign> <var> <plus> <"1">. In this example, <"1"> is not a token category, but a literal value of 1. As shown by reference number 440, assume that client device 210 identifies this replacement pattern of <var> <assign> <var> <plus> <"1">, and generates a replacement token string of [a] [=] [a] [+] [1] based on the replacement pattern and the input text. For example, in the replacement token string, client device 210 may represent the variable token category (e.g., <var>) with the variable "a" (e.g., [a]) from the input text, may represent the assignment operator token category (e.g., <assign>) using an equal sign (e.g., [=]), may represent the addition operator token category (e.g., <plus>) using a plus sign (e.g., [+]), and may represent the literal value of "1" with the number 1.

In some implementations, client device 210 may validate the replacement token string in a similar manner as the tokenized text (e.g., shown in FIG. 4A) to determine whether the replacement token string is valid for the programming language associated with TCE 220. If the replacement token string is invalid, client device 210 may perform a similar process to that shown in FIGS. 4A and 4B to determine a valid replacement token string based on the invalid replacement token string. For example, client device 210 may determine a valid replacement token string based on an error associated with the invalid replacement token string and a token category pattern associated with the invalid replacement token string. For the purpose of implementation 400, assume that the replacement token string of [a] [=] [a] [+] [1] is valid.

As further shown, data structure 430 may store information that identifies text for an error prompt to be provided for display via a user interface. In this case, the text for the error prompt is shown as "This TCE does not support the post-increment operator (x++)." The error prompt text may provide an indication, to the user, of why a correction was made to program code input by the user.

As shown in FIG. 4C, and by reference number 445, assume that client device 210 uses the replacement token string of [a] [=] [a] [+] [1] to generate and provide valid program code. As shown by reference number 450, assume that the valid program code is "a=a+1." As shown in FIG. 4C, client device 210 may provide a suggestion to the user via the user interface, shown as "Did you mean . . . ," and may provide an input mechanism for the user to select, for example, "Yes" or "No." If the user selects "Yes," client device 210 may provide the valid program code via the user interface, may replace the input text with the valid program code, may execute the valid program code, or may perform some other action involving the valid program code. If the user selects "No," client device 210 may attempt to determine other valid program code using the example operations described herein. In some implementations, client device 210 may automatically perform an action involving the valid program code (e.g., providing the valid program code, replacing the input text, executing the valid program code, etc.) without prompting the user for input regarding the valid program code. As shown by reference number 455, client device 210 may provide error prompt text, identified from data structure 430, for display via the user interface. For example, and as shown, client device 210 may provide the text "This TCE does not support the post-increment operator (x++)."

In this way, client device 210 may increase the ease and efficiency of writing program code in a programming language associated with TCE 220. By determining valid program code based on invalid input text, client device 210 may also save time and computing resources that would otherwise be wasted by attempting to execute input text that is invalid for the programming language associated with TCE 220.

As indicated above, FIGS. 4A-4C are provided merely as an example. Other examples are possible and may differ from what was described with regard to FIGS. 4A-4C.

Figure 5:
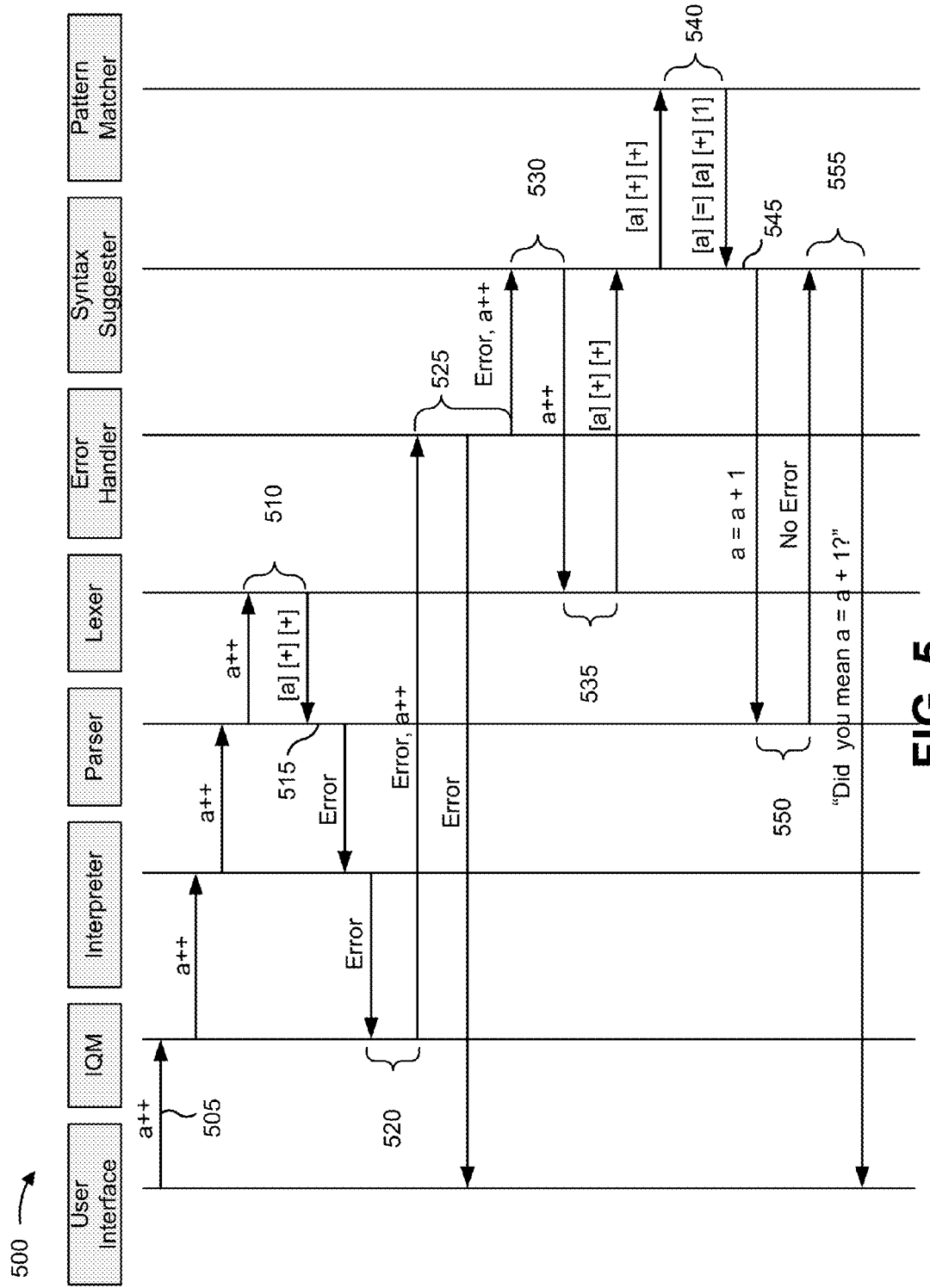
FIG. 5 is an example sequence diagram for converting from incorrect program code to correct program code.

FIG. 5 is an example sequence diagram 500 for converting from incorrect program code to correct program code.

As shown in FIG. 5, TCE 220 may include multiple components, such as a user interface, an interpreter queue manager (IQM), an interpreter, a parser, a lexer, an error handler, a syntax suggester, and a pattern matcher.

For the purpose of FIG. 5, assume that a user has input the text "a++" via the user interface. Assume that the text "a++" is syntactically incorrect for a programming language associated with TCE 220, and that the text "a++" results in an error when compiled and/or executed. As shown by reference number 505, the IQM may receive the input text of "a++" based on the user input, and may input this text into a queue for processing by the interpreter. The interpreter may attempt to interpret the text, and may pass a result of the interpretation to the parser. The parser may parse the text, and may pass result of parsing the text to the lexer.

As shown by reference number 510, the lexer may tokenize the input text by segmenting the input text into meaningful programming elements, or tokens. As shown, assume that the lexer tokenizes the input text of "a++" into a string of three tokens, shown as [a] [+] [+], where each token is shown in brackets. As shown, the lexer may pass the tokens to the parser, which may parse the tokens. In this case, assume that the parser generates an error base on parsing the tokens, as shown by reference number 515. The parser may pass the error to the interpreter, which may in turn pass the error to the IQM.

As shown by reference number 520, the IQM may pass the error and the input text of "a++" to the error handler. As shown by reference number 525, the error handler may provide an error to the user interface, which may provide the error for display. Further, the error handler may provide the error to the syntax suggester. As shown by reference number 530, the syntax suggester may pass the input text of "a++" to the lexer. The lexer may generate tokens for the input text, as shown by reference number 535 (e.g., [a] [+] [+]), and may pass the tokens to the syntax suggester, which may pass the tokens to the pattern matcher.

As shown by reference number 540, the pattern matcher may identify a replacement token string, shown as [a] [=] [a] [+] [1]. The pattern matcher may pass the replacement token string to the syntax suggester. As shown by reference number 545, the syntax suggester may identify program code based on the replacement token string, shown as "a=a+1," and may pass the program code to the parser. As shown by reference number 550, the parser may determine that the program code is valid, and may pass an indication, to the syntax suggester, that there the program code is valid (e.g., is not associated with an error).

As shown by reference number 555, based on the indication of no error, the syntax suggester may provide the valid program code as a suggestion to the user interface, which may provide the program code as part of a prompt to the user (e.g., "Did you mean a=a+1"). In this way, TCE 220 may convert incorrect program code to correct program code.

As indicated above, FIG. 5 is provided merely as an example. Other examples are possible and may differ from what was described with regard to FIG. 5.

FIGS. 6A-6E are diagrams of another example implementation 600 of converting from incorrect program code to correct program code. FIGS. 6A-6E show an example of correcting multiple errors associated with invalid input text.

Figure 6A:
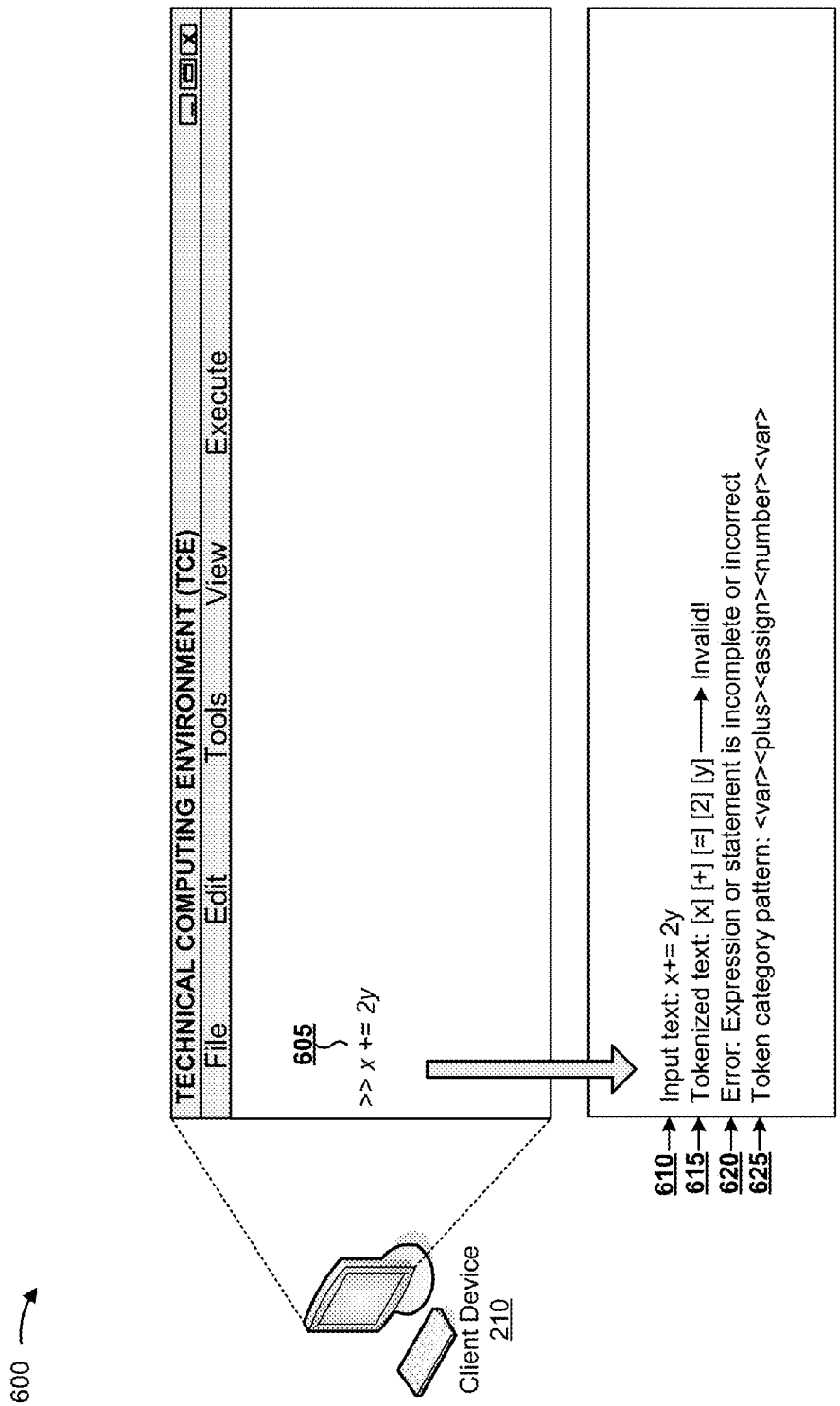

As shown in FIG. 6A, and by reference number 605, assume that the user inputs the text "x+=2y" via the user interface. Assume that the text "x+=2y" is syntactically incorrect for a programming language associated with TCE 220, and that the text "x+=2y" results in an error when compiled and/or executed. As shown by reference number 610, assume that client device 210 receives the input text of "x+=2y" based on the user input. As shown by reference number 615, assume that client device 210 tokenizes the input text of "x+=2y" into a string of five tokens, shown as [x] [+] [=] [2] [y], where each token is shown in brackets. As further shown, assume that client device 210 determines that this token string is invalid for the programming language associated with TCE 220.

As shown by reference number 620, assume that client device 210 identifies an error associated with the invalid token string. In this case, assume that the token string of [x] [+] [=] [2] [y] (and more specifically, the subset token string of [2] [y]) results in an error of "Expression or statement is incomplete or incorrect." As shown by reference number 625, assume that client device 210 identifies a token category pattern of <var> <plus> <assign> <number> <var> for the invalid token string of [x] [+] [=] [2] [y], indicating that "x" is a variable (e.g., represented as "<var>"), that the plus sign is an addition operator (e.g., represented as "<plus>"), that the equal sign is an assignment operator (e.g., represented as "<assign>"), that the value of 2 is a number (e.g., represented as "<number>"), and that "y" is also a variable (e.g., represented as "<var>").

As shown in FIG. 6B, assume that client device 210 uses a data structure 630 to identify a replacement pattern (e.g., a different token category pattern) based on the error and the token category pattern. As shown by reference number 635, assume that the data structure 630 indicates that the error of "Expression or statement is incomplete or incorrect" and the token category pattern of <number> <var> (e.g., which is a subset of the token category pattern of <var> <plus> <assign> <number> <var>, identified as shown in FIG. 6A) are associated with a replacement pattern of <number> <times> <var>. As further shown, data structure 630 may store information that identifies text for an error prompt to be provided for display via a user interface. In this case, the text for the error prompt is shown as "This TCE needs the times operator between a number and a variable."

As shown by reference number 640, assume that client device 210 identifies this replacement pattern of <number> <times> <var>, and generates a replacement token string of [2] [*] [y] based on the replacement pattern and the input text. Client device 210 may replace [2] [y], in the invalid token string [x] [+] [=] [2] [y], with the token string of [2] [*] [y] to generate a replacement token string of [x] [+] [=] [2] [*] [y]. As further shown, client device 210 may validate the replacement token string of [x] [+] [=] [2] [*] [y].

Figure 6C:
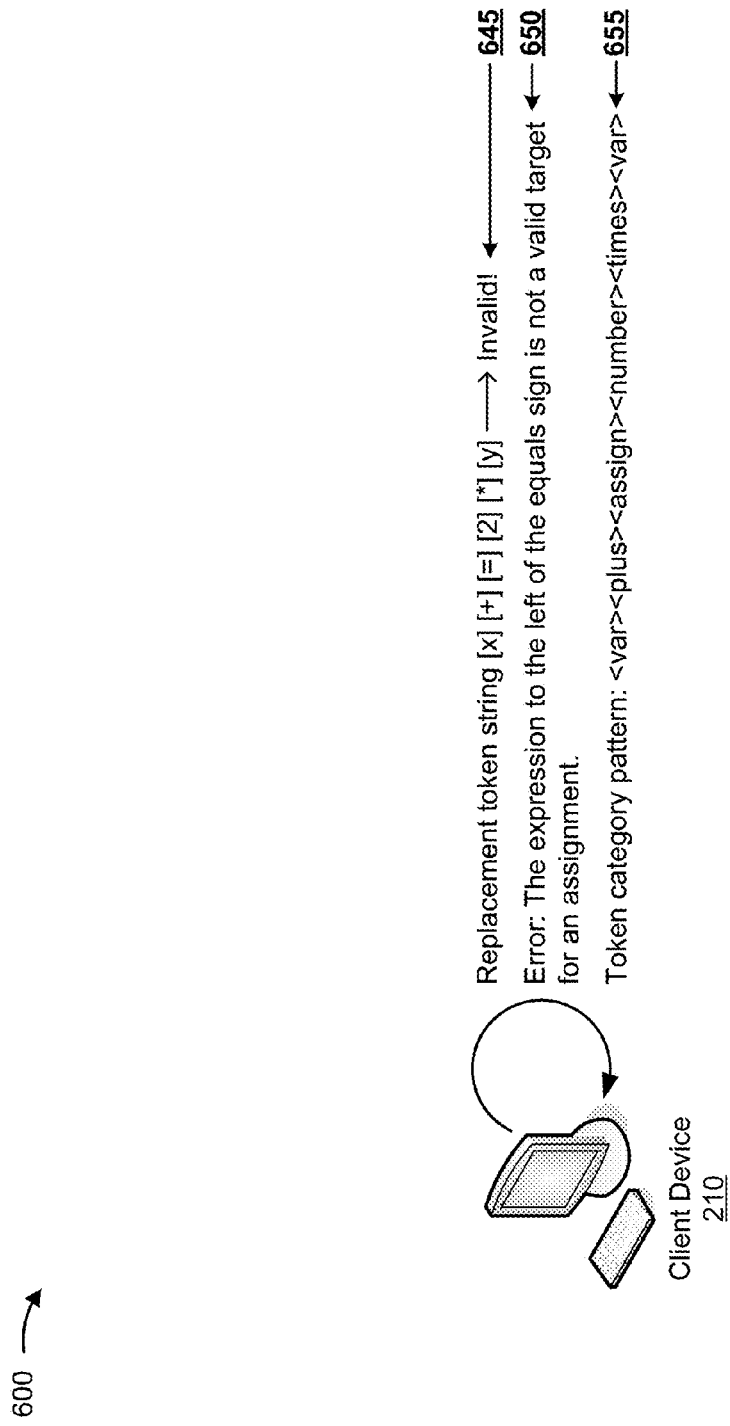

As shown in FIG. 6C, and by reference number 645, assume that client device 210 determines that the replacement token string is invalid, and determines an error associated with the invalid token string. As shown by reference number 650, assume that the error is "The expression to the left of the equals sign is not a valid target for an assignment." As shown by reference number 655, assume that client device 210 identifies a token category pattern of <var> <plus> <assign> <number> <times> <var> for the invalid token string.

Figure 6D:
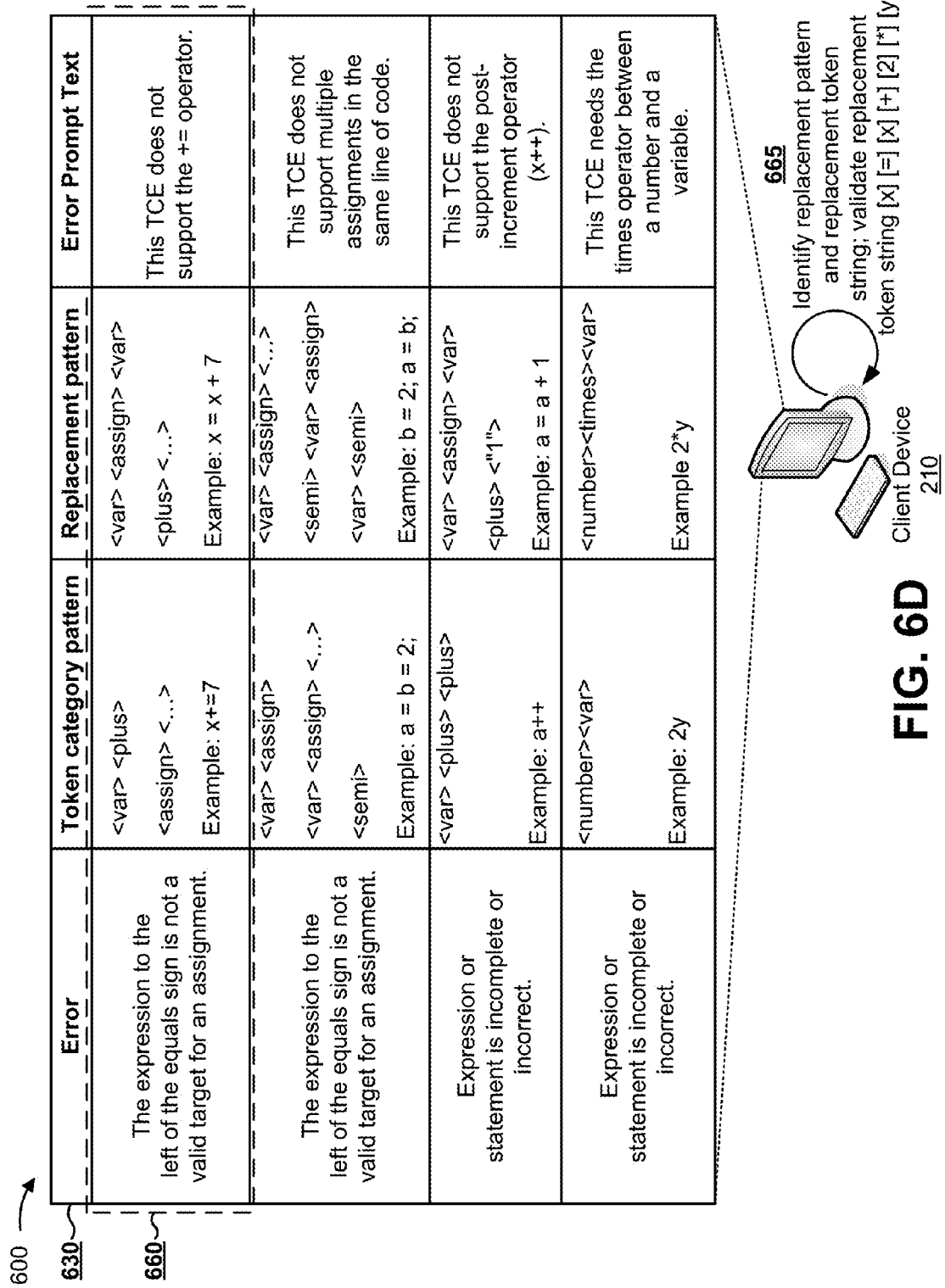

As shown in FIG. 6D, and by reference number 660, assume that data structure 630 indicates that the error of "The expression to the left of the equals sign is not a valid target for an assignment" and the token category pattern of <var> <plus> <assign> < . . . > (e.g., where < . . . > represents a wildcard) are associated with a replacement pattern of <var> <assign> <var> <plus> < . . . >. As further shown, data structure 630 may store information that identifies text for an error prompt to be provided for display via a user interface. In this case, the text for the error prompt is shown as "This TCE does not support the +=operator."

As shown by reference number 665, assume that client device 210 identifies this replacement pattern of <var> <assign> <var> <plus> < . . . >, and generates a replacement token string of [x] [=] [x] [+] [2] [*] [y] based on the replacement pattern and the input text. Assume that client device 210 successfully validates this replacement token string.

Figure 6E:
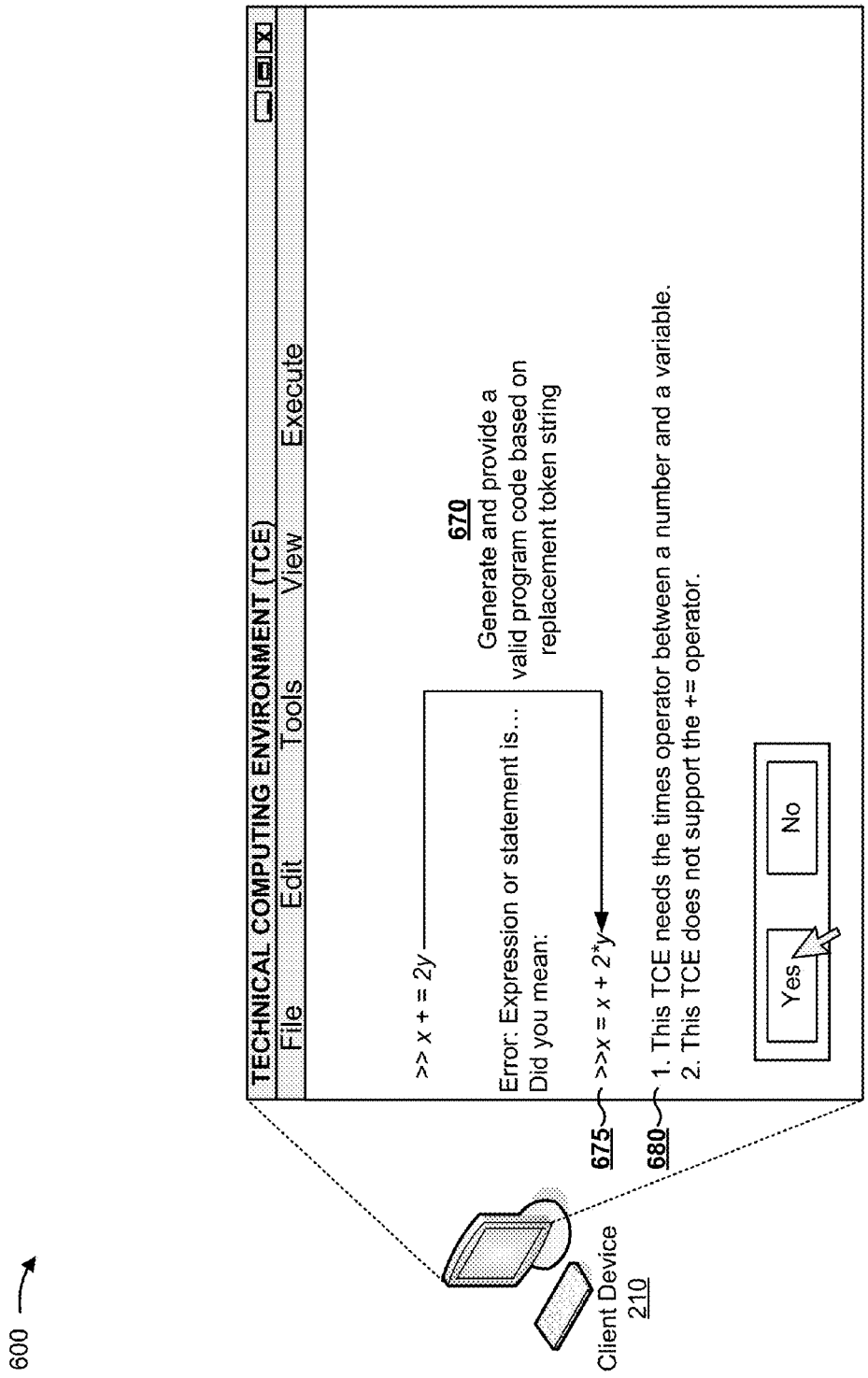

As shown in FIG. 6E, and by reference number 670, assume that client device 210 uses the replacement token string of [x] [=] [x] [+] [2] [*] [y] to generate and provide valid program code. As shown by reference number 675, assume that the valid program code is "x=x+2*y." As shown by reference number 685, client device 210 may provide error prompt text, identified from data structure 630, for display via the user interface. For example, and as shown, client device 210 may provide the text "This TCE needs the times operator between a number and a variable" and "This TCE does not support the +=operator." In this case, client device 210 corrected two errors associated with the input program code, so client device 210 provides text for two error prompts for display.

As further shown in FIG. 6E, client device 210 may provide a suggestion to the user to use the valid program code. Alternatively, client device 210 may automatically use the valid program code without user input. In this way, client device 210 may increase the ease and efficiency of writing program code in a programming language associated with TCE 220. By determining valid program code based on invalid input text, client device 210 may also save time and computing resources that would otherwise be wasted by attempting to execute input text that is invalid for the programming language associated with TCE 220.

As indicated above, FIGS. 6A-6E are provided merely as an example. Other examples are possible and may differ from what was described with regard to FIGS. 6A-6E.

Figure 7:
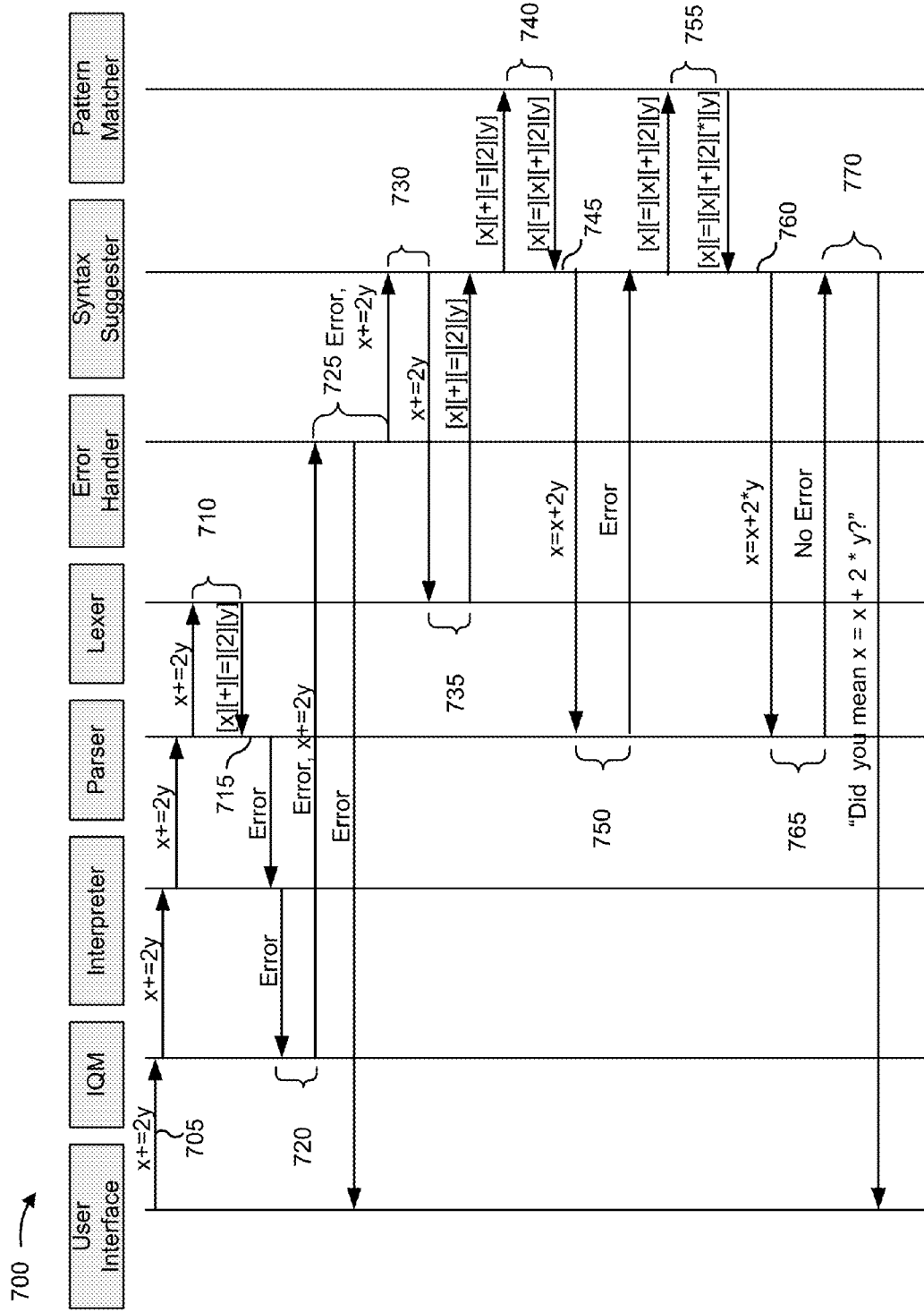
FIG. 7 is an example sequence diagram for converting from incorrect program code to correct program code.

FIG. 7 is an example sequence diagram 700 for converting from incorrect program code to correct program code.

As shown in FIG. 7, TCE 220 may include multiple components, such as a user interface, an interpreter queue manager (IQM), an interpreter, a parser, a lexer, an error handler, a syntax suggester, and a pattern matcher.

For the purpose of FIG. 7, assume that a user has input the text "x+=2y" via the user interface. Assume that the text "x+=2y" is syntactically incorrect for a programming language associated with TCE 220, and that the text "x+=2y" results in an error when compiled and/or executed. As shown by reference number 705, the IQM may receive the input text of "x+=2y" based on the user input, and may input this text into a queue for processing by the interpreter. The interpreter may attempt to interpret the text, and may pass a result of the interpretation to the parser. The parser may parse the text, and may pass result of parsing the text to the lexer.

As shown by reference number 710, the lexer may tokenize the input text by segmenting the input text into meaningful programming elements, or tokens. As shown, assume that the lexer tokenizes the input text of "x+=2y" into a string of three tokens, shown as [x] [+] [=] [2] [y], where each token is shown in brackets. As shown, the lexer may pass the tokens to the parser, which may parse the tokens. In this case, assume that the parser generates an error base on parsing the tokens, as shown by reference number 715. The parser may pass the error to the interpreter, which may in turn pass the error to the IQM.

As shown by reference number 720, the IQM may pass the error and the input text of "x+=2y" to the error handler. As shown by reference number 725, the error handler may provide an error to the user interface, which may provide the error for display. Further, the error handler may provide the error to the syntax suggester. As shown by reference number 730, the syntax suggester may pass the input text of "x+=2y" to the lexer. The lexer may generate tokens for the input text, as shown by reference number 735 (e.g., [x] [+] [=] [2] [y]), and may pass the tokens to the syntax suggester, which may pass the tokens to the pattern matcher.

As shown by reference number 740, the pattern matcher may identify a replacement token string, shown as [x] [=] [x] [+] [2] [y]. The pattern matcher may pass the replacement token string to the syntax suggester. As shown by reference number 745, the syntax suggester may identify program code based on the replacement token string, shown as "x=x+2y," and may pass the program code to the parser. As shown by reference number 750, the parser may determine that the program code is invalid, and may pass an indication, to the syntax suggester, that there the program code is invalid (e.g., is associated with an error).

As shown by reference number 755, the pattern matcher may identify another replacement token string, shown as [x] [=] [x] [+] [2] [*] [y]. The pattern matcher may pass the replacement token string to the syntax suggester. As shown by reference number 760, the syntax suggester may identify program code based on the replacement token string, shown as "x=x+2*y," and may pass the program code to the parser. As shown by reference number 765, the parser may determine that the program code is valid, and may pass an indication, to the syntax suggester, that there the program code is valid (e.g., is not associated with an error).

As shown by reference number 770, based on the indication of no error, the syntax suggester may provide the valid program code as a suggestion to the user interface, which may provide the program code as part of a prompt to the user (e.g., "Did you mean x=x+2*y"). In this way, TCE 220 may convert incorrect program code to correct program code.

As indicated above, FIG. 7 is provided merely as an example. Other examples are possible and may differ from what was described with regard to FIG. 7.

Figure 8:
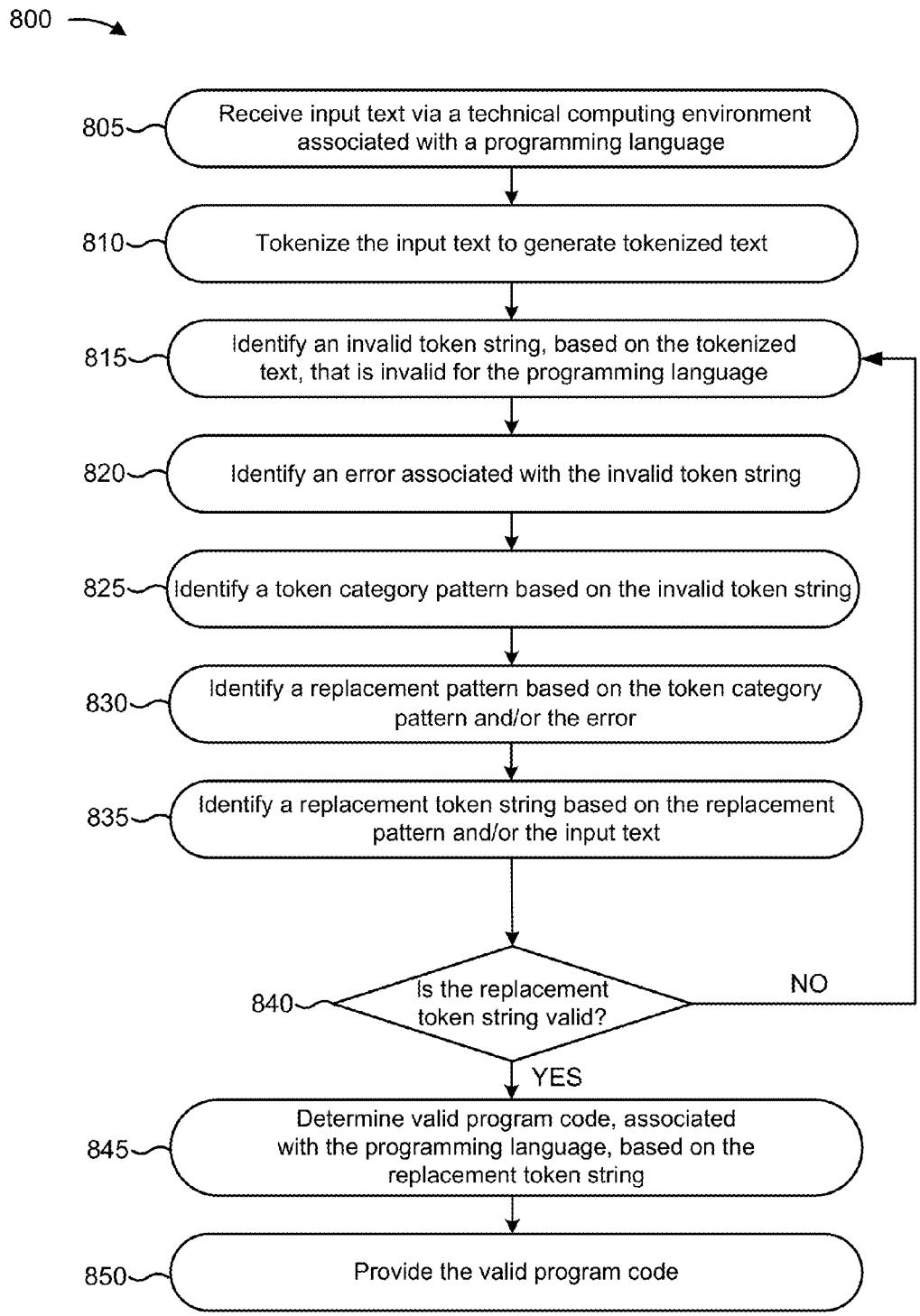
FIG. 8 is a flow chart of an example process for converting from incorrect program code to correct program code.

FIG. 8 is a flow chart of an example process 800 for converting from incorrect program code to correct program code. In some implementations, one or more process blocks of FIG. 8 may be performed by client device 210. In some implementations, one or more process blocks of FIG. 8 may be performed by another device or a set of devices separate from or including client device 210, such as server device 230.

As shown in FIG. 8, process 800 may include receiving input text via a technical computing environment associated with a programming language (block 805). For example, client device 210 may receive input text via TCE 220, which may include a programming environment associated with a programming language. For example, TCE 220 may be capable of compiling and/or executing program code associated with a first programming language, and may not be capable of compiling and/or executing program code associated with a second programming language. In some implementations, TCE 220 may provide a user interface for receiving input text, such as a text editor, a code editor, a command line interface, or the like.

In some implementations, the input text may include program code that is valid for a particular programming language, but that is invalid for another programming language. Additionally, or alternatively, the input text may include text that is not valid program code in any programming language. In this case, the input text may include a string of characters. For example, the input text may include a mathematical expression. In some implementations, the input text may be input (e.g., typed) by a user. Additionally, or alternatively, the input text may be loaded from a file, or may be input in another manner.

As further shown in FIG. 8, process 800 may include tokenizing the input text to generate tokenized text (block 810). For example, client device 210 may tokenize the input text to generate tokenized text by segmenting the input text into meaningful programming elements, or tokens (e.g., using lexical analysis, a lexer, a tokenizer, or the like). In some implementations, client device 210 may use one or more delimiters (e.g., spaces, character separators, line breaks, commas, semicolons, white space, etc.) to tokenize the input text. As used herein, a token may be represented between brackets. For example, the input text "Var_1=100," which may represent an assignment of the value 100 to the variable "Var_1," may be tokenized to [Var_1] [=] [100].

As further shown in FIG. 8, process 800 may include identifying an invalid token string, based on the tokenized text, that is invalid for the programming language (block 815). For example, client device 210 may analyze the tokenized text to identify an invalid token string. A token string may include a sequence of two or more tokens (e.g., two or more consecutive tokens). An invalid token string may include a token string that is not compilable or executable using the programming language associated with TCE 220. In other words, TCE 220 may not be able to compile and/or execute the invalid token string. When attempting to parse the invalid token string for compilation and/or execution, TCE 220 (e.g., a parser associated with TCE 220) may return an error.

As further shown in FIG. 8, process 800 may include identifying an error associated with the invalid token string (block 820). For example, when parsing the invalid token string, client device 210 (e.g., TCE 220 executing on client device 210) may generate an error. In some implementations, the error may be identified by an error identifier (e.g., an error code), such as an error number, a string of text that identifies the error, or the like. In some implementations, a parser associated with TCE 220 may identify and/or return the error and/or the error identifier.

As further shown in FIG. 8, process 800 may include identifying a token category pattern based on the invalid token string (block 825). For example, client device 210 may analyze the invalid token string to identify a token category pattern associated with the invalid token string. A token category pattern may refer to a pattern of token categories and/or literal values (e.g., a particular combination and/or sequence of token categories and/or literal values, a sequence of consecutive token categories and/or literal value, etc.). A token category may indicate a type of a token for the purpose of parsing. Example of token categories include a variable, different types of mathematical operations (e.g., addition operator, subtraction operator, multiplication operator, division operator, etc.), an assignment operator (e.g., used to assign a value to a variable), a number, a type of number (e.g., an integer date type, a floating point data type, etc.), an array, a literal value, an end of statement, an identifier, a wildcard (e.g., that represents any type of token category and/or literal value), or the like. In some implementations, a token category pattern may be represented as a regular expression (e.g., a sequence of characters that forms a search pattern, which may be used in pattern matching).

As further shown in FIG. 8, process 800 may include identifying a replacement pattern based on the token category pattern and/or the error (block 830). For example, client device 210 may identify a replacement pattern using the token category pattern and/or the error. The replacement pattern may include another token category pattern that is different from the token category pattern associated with the invalid token string. In some implementations, client device 210 may determine the replacement pattern based on the token category pattern associated with the input text. Additionally, or alternatively, client device 210 may determine the replacement pattern based on the error associated with the input text. In some implementations, client device 210 may determine the replacement pattern based on both the error and the token category pattern.

In some implementations, client device 210 may use a data structure, pattern matching, a regular expression search, an Internet search, or the like, to identify the replacement pattern using the token category pattern and/or the error. For example, client device 210 may store and/or access a data structure that indicates an association between a replacement pattern and a token category pattern and/or that indicates an association between a replacement pattern and an error. Client device 210 may search the data structure, using the token category pattern and/or the error, to identify the replacement pattern.

The table below represents an example of such as data structure, which may store an indication of token category patterns that map to replacement patterns in different scenarios. The below table does not show errors that correspond to the replacement patterns. In some implementations, the data structure may include such errors (e.g., as shown in FIGS. 4B, 6B, and 6D). The below table also shows example, which may or may not be included in the data structure.

| Scenario Type | Token Category Pattern | Replacement Pattern | Example |
|---|---|---|---|
| Operator Assignment | <var> <plus> <assign> <...> | <var> <assign> <var> <plus> <...> | a+ =7 becomes a = a + 7 |
| Postfix Increment, Decrement, etc. | <var> <plus> <plus> | <var> <assign> var> <plus> <"1"> | a++ becomes a = a + 1 |
| Nested Postfix Increment, Decrement, etc. | <function> <left paren> <var> <plus> <plus> <right paren> | Intermediate: <function> <left paren> <var> <right paren> <comma> <var> <plus> <plus> Final: <function> <left paren> <var> <right paren> <comma> <var> <assign> <var> <plus> <"1"> | Example: num2str(a++) becomes num2str(a), a++ becomes num2str(a), a = a + 1 (See FIGS. 6A-6E) |
| Chain of Assignments | <var> <assign> <var> <assign> <var> <assign> <...> <semi> | <var> <assign> <...> <semi> <var> <assign> <var> <semi> <var> <assign> <var> <semi> | a = b = c = 7; becomes c = 7; b = c; a = b; |

-continued

| Scenario Type | Token Category Pattern | Replacement Pattern | Example |
|---|---|---|---|
| Constant Abutting Identifier | \<var> \<assign> \<number> \<var> | \<var> \<assign> \<number> \<times> \<var> | c = 2y becomes c = 2 * y |
| Constant Abutting Parenthesized Expression | \<var> \<left paren> < ... > \<right paren> | \<var> \<times> \<left paren> < ... > \<right paren> | 2(x + y) becomes 2* (x + y) |
| Consecutive Parenthesized Expression | \<left paren> < ... > \<right paren> \<left paren> < ... > \<right paren> | \<left paren> < ... > \<right paren> \<times> \<left paren> < ... > \<right paren> | (x + y) (x − y) becomes (x + y) * (x − y) |
| Named Arguments for Another Programming Language | \<namespace> \<dot> \<function> \<left paren> \<var> \<assign> < ... > \<right paren> | \<namespace> \<dot> \<function> \<left paren> \<function> \<left paren> \<string> \<comma> < ... > \<right paren> \<right paren> | Example using Python py.fcn(Arg = 1) becomes py.fcn(pyargs('Arg'), 1)) |
| Dictionary for Another Programming Language | \<left brace> \<string> \<colon> < ... > \<comma> \<string> \<colon> < ... > \<right brace> | \<function> \<left paren> \<string> \<comma> < ... > \<comma> \<string> \<comma> < ... > \<right paren> | {'val': x, 'foo': 23} becomes struct('var', x, 'foo, 23) |
| Not Equal | <"!"> | <"~"> | !x becomes ~x  x ! = 2 becomes x ~ = 2 |
| Bitwise Operator Assignment | \<var> \<pipe> \<assign> < ... > | \<var> \<assign> \<var> \<pipe> < ... > | a \| = true becomes a = a \| true |
| Type Casting | \<left paren> \<data type> \<right paren> \<var> | \<data type> \<left paren> \<var> \<right paren> | (double)x becomes double(x) |
| Nested Comparisons | \<var> \<comparator> \<var> \<comparator> \<var> | \<var> \<comparator> \<var> <"&&"> \<var> \<comparator> \<var> | a < b < c becomes a < b && b < c |
| Exponentiation | \<var> <""> < ... > | \<var> <"^"> < ... > | x2 becomes x^2 |
| Comments | <"//"> < ... > | <"%"> < ... > | // comment becomes % comment |

The above scenario types, token category patterns, and replacement patterns are provided as examples. Other scenario types, token category patterns, and replacement patterns are possible and may be used in connection with the techniques described herein. Furthermore, where one mathematical operator is described (e.g., an addition operator \<plus>), other mathematical operators may be substituted (e.g., a subtraction operator \<minus>, a multiplication operator \<times>, a division operator \<divide>, etc.).

As further shown in FIG. 8, process 800 may include identifying a replacement token string based on the replacement pattern and/or the input text (block 835). For example, client device 210 may use the replacement pattern and/or the input text (or the tokenized text) to generate a replacement token string. The replacement token string may include a sequence of two or more tokens (e.g., two or more consecutive tokens) to replace the invalid token string. The replacement pattern may identify a token category for a token to be included in the replacement token string, and the input text and/or the tokenized text may identify a corresponding token, included in the token category, to be included in the replacement token string.

As an example, assume that client device 210 tokenizes the input text "Var_1+=100" to generate the invalid token string [Var_1] [+] [=] [100], which is associated with an error. Further, assume that client device 210 identifies a token category pattern of \<variable> \<addition operator> \<assignment operator> \<literal value> for this invalid token string. Here, the token category of \<variable> corresponds to the variable "Var_1," the token category of \<addition operator> corresponds to the plus sign (+), the token category of \<assignment operator> corresponds to the equal sign (=), and the token category of \<literal value> corresponds to the literal value of "100." In some implementations, client device 210 may store an indication of these correspondences between token categories and tokens determined based on the input text. Client device 210 may then use the stored indications to generate the replacement token string based on the replacement pattern.

In some implementations, a token category pattern may include multiple instances of the same token category. For example, the input text "a=b+c" would have three instances of a \<variable> token category (e.g., one for "a," one for "b," and one for "c"). In this case, client device 210 may store a correspondence indicator that indicates a correspondence between a token category and a particular token. For example, client device 210 may use a correspondence indicator of \<variable(1)> to represent "a," \<variable(2)> to represent "b," and \<variable(3)> to represent "c."

Returning to the above example of "Var_1+=100," which is associated with an error and a token category pattern of \<variable> \<addition operator> \<assignment operator> \<literal value>, client device 210 may search a data structure using the error and/or the token category pattern to identify a replacement pattern of \<variable> \<assignment operator> \<variable> \<addition operator> \<literal value>. Using this replacement pattern and the tokenized text (e.g., using stored correspondence indicators that indicate which tokens correspond to which token categories), client device 210 may generate the replacement token string of [Var_1] [=] [Var_1] [+] [100].

As further shown in FIG. 8, process 800 may include determining whether the replacement token string is valid (block 840). For example, client device 210 may determine whether the replacement token string is valid, in a similar manner as determining whether tokenized text is valid, described above in connection with block 815. For example, client device 210 may parse the replacement token string (e.g., using a parser) to determine whether the replacement token string is compilable, executable, etc., or whether the replacement token string returns an error.

As further shown in FIG. 8, if the replacement token string is invalid (block 840—NO), then process 800 may include returning to block 815 to identify an invalid token string. For example, if client device 210 determines that the replacement token string is invalid, then client device 210 may identify the replacement token string as the invalid token string. In this case, the replacement token string may be the invalid token string, and processing may continue (e.g., iteratively) until client device 210 determines a valid replacement token string. In some implementations, if client device 210 cannot determine a valid replacement token string, client device 210 may provide, for display via a user interface, an indication that the input text is invalid and/or that valid program code could not be determined based on the invalid input text. In some implementations, client device 210 may provide, for display, an error message that indicates the error associated with the invalid token string.

As further shown in FIG. 8, if the replacement token string is valid (block 840—YES), then process 800 may include determining valid program code, associated with the programming language, based on the replacement token string (block 845). For example, if client device 210 determines that the replacement token string is valid, then client device 210 may generate valid program code based on the replacement token string. The valid program code may be valid (e.g., compilable, executable, etc.) with respect to a programming language associated with TCE 220. In some implementations, client device 210 may generate the valid program code by de-tokenizing the replacement token string. For example, client device 210 may de-tokenize the replacement token string of [Var_1] [=] [Var_1] [+] [100] to generate the valid program code of "Var_1=Var_1+100."

As further shown in FIG. 8, process 800 may include providing the valid program code (block 850). For example, client device 210 may provide the valid program code (e.g., for display, for execution, to another device for display or execution, etc.). In some implementations, client device 210 may provide a prompt for display via a user interface of TCE 220. The prompt may include the valid program code, and may include one or more input mechanisms that permit a user to accept or reject the valid program code. Additionally, or alternatively, the prompt may include text or another indicator that indicates to the user that the input text is invalid, that the valid program code is recommended as a replacement for the input text, or the like.

If the user accepts the valid program code, client device 210 may replace the input text with the valid program code (e.g., in a user interface of TCE 220, such as a code editor), may input the valid program code (e.g., as input to a user interface of TCE 220), or the like. If the user rejects the valid program code, then client device 210 may not replace the input text with the valid program code, may not input the valid program code, or the like. In some implementations, client device 210 may replace the input text with the valid program code, may input the valid program code, etc., without prompting the user. In this way, client device 210 and TCE 220 may assist users in writing program code using an unfamiliar programming language.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Implementations described herein provide a user with feedback regarding the semantic accuracy of the user's input code or text. For example, the feedback may include an automatic correction of input code, an indication on a user interface that input code is incorrect and a suggestion to correct the input code, or the like. This feedback may enable more efficient, syntactically-correct implementation of code when the input code is syntactically incorrect for the intended programming language. Furthermore, implementations described herein may conserve computing resources that would otherwise be wasted by attempting to execute input text that is invalid for a programming language.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions the instructions comprising:
   one or more instructions that, when executed by one or more processors, cause the one or more processors to:
   receive input text via a programming environment associated with a programming language;
   tokenize the input text to generate tokenized text;
   identify an error within the tokenized text;
   identify an invalid token string, based on the tokenized text and the identified error, that is invalid for the programming language;
   identify a token category pattern based on the invalid token string,
   the token category pattern being a first sequence of token categories;
   identify a replacement pattern based on the token category pattern and/or the error,
   the replacement pattern being a second sequence of token categories that is different from the first sequence of token categories;
   identify a replacement token string based on the replacement pattern;
   determine valid program code, associated with the programming language, based on the replacement token string; and
   provide the valid program code.

2. The computer-readable medium of claim 1,
   where the one or more instructions, that cause the one or more processors to identify the replacement pattern, further cause the one or more processors to:
   identify the replacement pattern based on the token category pattern and the error.

3. The computer-readable medium of claim 1, where the one or more instructions, that cause the one or more processors to identify the replacement token string, further cause the one or more processors to:
   identify the replacement token string based on at least one of:
   the input text, or
   the tokenized text.

4. The computer-readable medium of claim 1, where the one or more instructions, when executed by the one or more processors, further cause the one or more processors to:
   determine whether the replacement token string is valid;
   selectively identify another replacement token string,
   the other replacement token string being identified when the replacement token string is invalid,
   the other replacement token string not being identified when the replacement token string is valid; and
   where the one or more instructions, that cause the one or more processors to determine the valid program code, further cause the one or more processors to:
   determine the valid program code based on whether the replacement token string is valid,
   the valid program code being determined based on the replacement token string when the replacement token string is valid, and
   the valid program code being determined based on the other replacement token string when the replacement token string is invalid.

5. The computer-readable medium of claim 1, where the one or more instructions, that cause the one or more processors to provide the valid program code, further cause the one or more processors to:
   provide, via the programming environment, a prompt that permits a user to indicate whether to accept or reject the valid program code;
   receive user input that indicates whether to accept or reject the valid program code; and
   selectively provide the valid program code for input to the programming environment based on the user input,
   the valid program code being provided for input to the programming environment when the user indicates to accept the valid program code, or
   the valid program code not being provided for input to the programming environment when the user indicates to reject the valid program code.

6. The computer-readable medium of claim 1, where the one or more instructions, that cause the one or more processors to provide the valid program code, further cause the one or more processors to:
   provide the valid program code for input to the programming environment without user input.

7. The computer-readable medium of claim 1, where the input text is program code in another programming language that is different from the programming language associated with the programming environment.

8. A method, comprising:
   receiving input text via a programming environment,
   the receiving being performed by one or more devices;
   tokenizing the input text to generate tokenized text,
   the tokenizing being performed by the one or more devices;

identifying an invalid token string based on the tokenized text,
    the identifying the invalid token string being performed by the one or more devices;
identifying a token category pattern or an error based on the invalid token string,
    the token category pattern being a first sequence of token categories,
    the identifying the token category pattern or the error being performed by the one or more devices;
identifying a replacement pattern based on the token category pattern or the error,
    the replacement pattern being a second sequence of token categories that is different from the first sequence of token categories,
    the identifying the replacement pattern being performed by the one or more devices;
identifying a replacement token string based on the replacement pattern,
    the identifying the replacement token string being performed by the one or more devices;
determining valid program code based on the replacement token string,
    the determining being performed by the one or more devices; and
providing the valid program code,
    the providing being performed by the one or more devices.

9. The method of claim 8, where identifying the replacement pattern further comprises:
    identifying the replacement pattern based on the token category pattern and the error.

10. The method of claim 8, where identifying the replacement token string further comprises:
    identifying the replacement token string based on the input text.

11. The method of claim 8, further comprising:
    determining that the replacement token string is valid; and
    where determining the valid program code further comprises:
        determining the valid program after determining that the replacement token string is valid.

12. The method of claim 8, where providing the valid program code further comprises:
    provide, via the programming environment, a prompt that permits a user to indicate whether to accept or reject the valid program code;
    receive user input that indicates to accept the valid program code; and
    provide the valid program code for input to the programming environment based on receiving the user input that indicates to accept the valid program code.

13. The method of claim 8, where providing the valid program code further comprises:
    providing the valid program code via a user interface of the programming environment.

14. The method of claim 8, where the input text is invalid program code.

15. A device, comprising:
one or more processors to:
receive input text via a programming environment associated with a programming language,
    the input text being invalid for the programming language;
identify an error associated with the input text;
identify an invalid token string, based on the input text, that is invalid for the programming language,
    the invalid token string being a string of tokens generated based on the input text;
    identify a token category pattern based on the invalid token string,
    the token category pattern being a first sequence of token categories;
identify a replacement pattern based on the token category pattern and/or the error,
    the replacement pattern being a second sequence of token categories that is different from the first sequence of token categories;
identify a replacement token string based on the replacement pattern;
determine valid program code, that is valid for the programming language, based on the replacement token string; and
provide the valid program code.

16. The device of claim 15,
where the one or more processors, when identifying the replacement pattern, are further to:
identify the replacement pattern based on both the token category pattern and the error.

17. The device of claim 15, where the one or more processors are further to:
tokenize the input text to generate tokenized text; and
where the one or more processors, when identifying the replacement token string, are further to:
    identify the replacement token string based on the tokenized text.

18. The device of claim 15, where the one or more processors are further to:
determine that the replacement token string is invalid;
identify another replacement token string based on determining that the replacement token string is invalid; and
where the one or more processors, when determining the valid program code, are further to:
    determine the valid program code based on the other replacement token string.

19. The device of claim 15, where the one or more processors, when providing the valid program code, are further to:
provide the valid program code via a user interface of the programming environment.

20. The device of claim 15, where the one or more processors, when providing the valid program code, are further to:
replace, on a user interface of the programming environment, the input text with the valid program code.

* * * * *